M. HERZOG.
GRIPPING DEVICE.
APPLICATION FILED JULY 11, 1914.
1,126,008.
Patented Jan. 26, 1915.
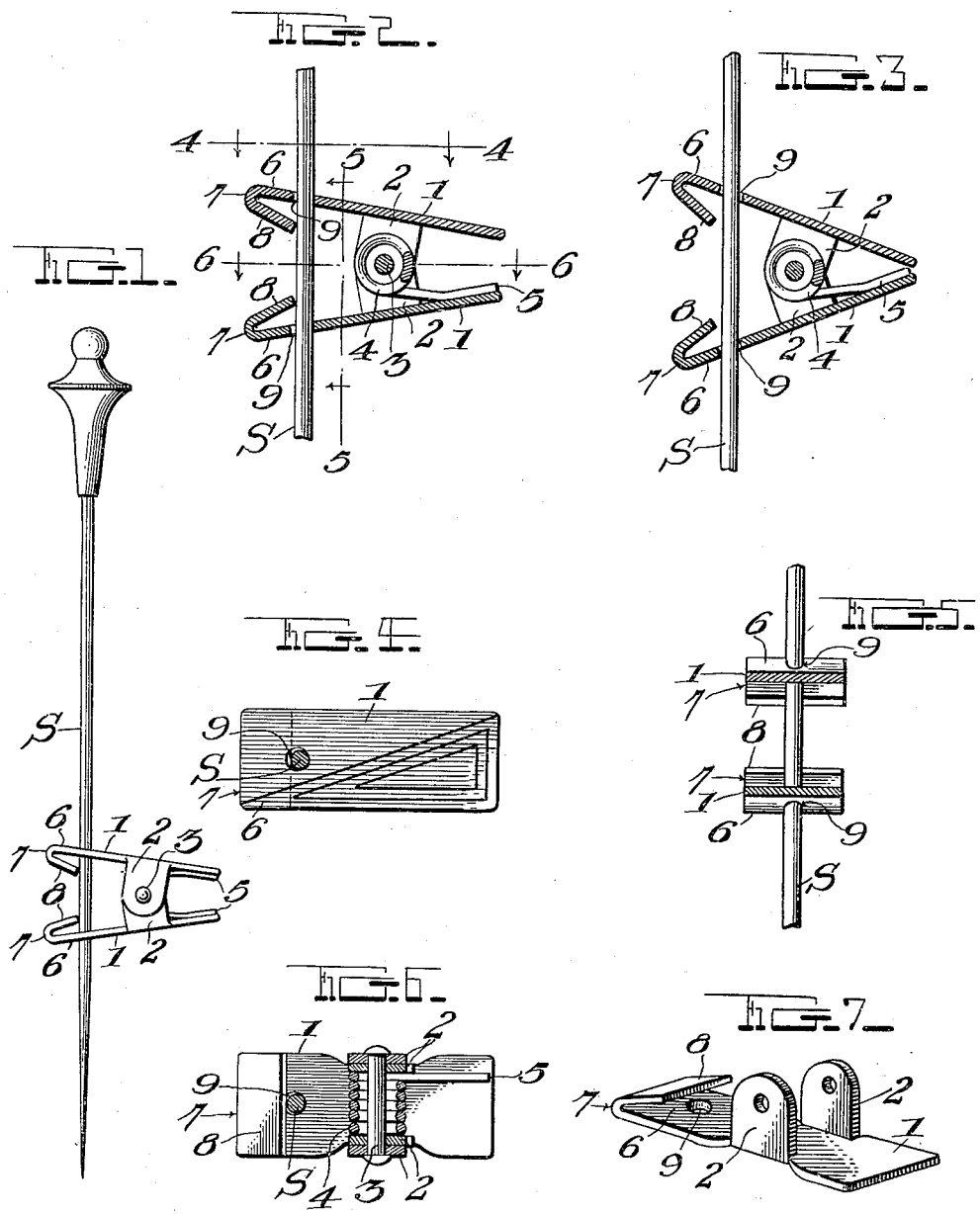
Inventor
Moses Herzog
By H. B. Willson &co
Attorneys
Witnesses
H. Woodard

UNITED STATES PATENT OFFICE.

MOSES HERZOG, OF WASHINGTON, DISTRICT OF COLUMBIA.

GRIPPING DEVICE.

1,126,008.  Specification of Letters Patent.  Patented Jan. 26, 1915.

Application filed July 11, 1914. Serial No. 850,378.

*To all whom it may concern:*

Be it known that I, MOSES HERZOG, a citizen of the United States, residing at Washington, in the District of Columbia, have invented certain new and useful Improvements in Gripping Devices; and I do declare the following to be a full, clear, and exact description of the invention, such as will enable others skilled in the art to which it appertains to make and use the same.

My invention relates to improvements in gripping devices and more particularly to those which are primarily designed for retaining stick pins, hat pins or the like against dislocation.

The main object of the invention is to provide a device of this character which will be extremely simple in construction yet one which will positively lock a pin or analogous form of shank against movement.

In carrying out the above end, a pair of pivotally united jaws are provided each having an opening near one end, said openings being alined and the ends of said jaws, adjacent said openings, being bent substantially upon themselves to provide gripping flanges, a spring being employed for forcing said flanges against the shank and thereby forcing the shank against one wall of the openings.

A further object is to provide a device of this character which will present an ornamental appearance and which will be extremely efficient in operation.

With the above objects in view, the invention resides in certain novel features of construction and combination herein described and claimed and shown in the drawings wherein—

Figure 1 is a side elevation of my improved gripping device showing the application thereof to the shank of a pin; Fig. 2 is an enlarged vertical section through the gripping device showing a portion of a shank gripped therein; Fig. 3 is a similar view showing the position of the parts when the shank is released; Fig. 4 is a horizontal section taken on the line 4—4 of Fig. 2; Fig. 5 is a vertical section taken on the line 5—5 of Fig. 2; Fig. 6 is a horizontal section taken on the line 6—6 of Fig. 2; and, Fig. 7 is a perspective view of one of the gripping jaws.

In the accompanying drawings, my improved gripping device or pin guard is shown as comprising a pair of jaws 1 each of which is here shown in the form of a rectangular elongated metal plate, said jaws having pivot ears or lugs 2 which extend toward each other and receive a transverse pivot pin 3 around which a coiled spring 4 is wound, the opposite ends 5 of said spring bearing against the adjacent substantially parallel inner surfaces of the jaws 1. It will be noted by reference to the drawings that the ears 2 are formed slightly nearer to one end of the jaws 1 than to the other ends and that the longer end portions 6 have their extreme ends or terminals bent substantially upon themselves as at 7 to provide gripping flanges 8 disposed obliquely to said jaws to adapt the inner edges of the terminals of said ends to bite into the shank to which the guard is applied to form in conjunction with the inner wall of the aperture in said jaw diagonally disposed gripping elements, whereby four points of contact spaced from each other are provided between the gripping device and the shank to which it is applied (see Fig. 2). It will be further noted that each of said portions 6 is provided with an opening 9, said openings being alined and being adapted to receive a shank S which may be the shank of a stick or hat pin or may be a portion of any other device forming no part of the present invention.

With the parts as above described, the free ends of the jaws 1 may be moved toward each other against the tension of the spring 4 thereby causing the portions 6 to recede one from the other, this movement causing the parts to stand as seen in Fig. 3 in which position the shank may be readily inserted through the alined openings 9 whereupon pressure may be released from the free ends of the jaws, thereby allowing the spring 4 to rock said jaws around their pivot thus forcing the inner ends of the flanges 8 into contact with one side of the shank and thereby forcing the opposite side of said shank into contact with one wall of the openings 9. In this position the shank is securely clamped within the gripping device and cannot be removed until the flanges 8 are allowed to recede from each other in the manner above set forth.

I have described a pair of openings 9 for the reception of the shank S but it will be seen that other means could be provided within the scope of the present invention since the salient portions of the openings are their rear walls which constitute gripping shoulders against which the shank S is forced by the flanges 8. By reference to the drawings it will be noted that I have shown the ends of the portions 6 as bent inwardly toward each other to form the clamping flanges 8 and that the tension of the spring 4 is exerted to force said portions 6 toward each other, but I wish it understood that the flanges 8 could be employed to equal advantage were they formed on the outer sides of the jaws 1 provided the spring were reversed in order to spread the portions 6 to cause the active edges of the flanges 8 to contact with the shank.

From the above set forth construction, it will be seen that I have produced an extremely simple article yet one which will be highly efficient in operation and which will positively retain the shank of a pin or other article therein.

Having thus described my invention what I claim is:

1. A gripping device comprising a pair of gripping jaws pivoted one to the other and having alined openings near one end adapted to receive a shank, the ends of said jaws adjacent the openings being bent inwardly at an oblique angle to said jaw to provide gripping flanges, and a spring for rocking said jaws whereby to force said gripping flanges into contact with said shank thereby forcing the latter against the opposite walls of the openings.

2. A gripping device comprising a pair of gripping jaws pivoted one to the other and having alined openings near one end adapted to receive a shank, the ends of said jaws adjacent the openings being bent inwardly at an oblique angle to position the inner edges of the terminals thereof for biting engagement with the shank, a spring for rocking said jaws whereby to bind said shank between the biting edges of said inturned terminals and the opposite walls of said openings.

In testimony whereof I have hereunto set my hand in presence of two subscribing witnesses.

MOSES HERZOG.

Witnesses:
C. E. Hunt,
J. A. Griesbauer.

Copies of this patent may be obtained for five cents each, by addressing the " Commissioner of Patents, Washington, D. C."